(12) United States Patent
Kanebako

(10) Patent No.: US 6,498,411 B2
(45) Date of Patent: Dec. 24, 2002

(54) BEARING APPARATUS

(75) Inventor: Hideki Kanebako, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 09/969,187

(22) Filed: Oct. 1, 2001

(65) Prior Publication Data

US 2002/0070617 A1 Jun. 13, 2002

(30) Foreign Application Priority Data

Oct. 10, 2000 (JP) ........................... 2000-309065

(51) Int. Cl.[7] ................................. H02K 7/09
(52) U.S. Cl. ........................... 310/90.5; 310/90
(58) Field of Search .................. 310/90.5, 90; 384/121

(56) References Cited

U.S. PATENT DOCUMENTS

| | | | | |
|---|---|---|---|---|
| 4,538,081 A | * | 8/1985 | Kamiya et al. | 310/90 |
| 4,998,033 A | * | 3/1991 | Hisabe et al. | 310/67 R |
| 5,019,738 A | * | 5/1991 | Weilbach et al. | 310/90 |
| 5,172,021 A | * | 12/1992 | Takahashi et al. | 310/156.04 |
| 5,280,208 A | * | 1/1994 | Komura et al. | 310/90 |
| 5,619,083 A | * | 4/1997 | Dunfield et al. | 310/90.5 |

FOREIGN PATENT DOCUMENTS

| | | | | |
|---|---|---|---|---|
| JP | 63-198796 | * | 8/1988 | F04D/29/04 |
| JP | 3-256547 | * | 11/1991 | H02K/7/09 |

* cited by examiner

*Primary Examiner*—Burton S. Mullins
(74) *Attorney, Agent, or Firm*—Hogan & Hartson, LLP

(57) ABSTRACT

A bearing apparatus includes a rotator body, a non-rotation body rotatably supporting the rotator body, and a lubrication fluid provided between the rotator body and the non-rotation body in which the rotator body is supported in a thrust direction by a thrust dynamic pressure bearing formed between the rotator body and the non-rotation body. The bearing apparatus includes an active magnetic bearing formed by a driving coil disposed on one of the rotator body and the non-rotation body and a magnet disposed on the other thereof, and a gap sensor that detects an axial direction gap between the rotator body and the non-rotation body. The thrust dynamic pressure bearing and the active magnetic bearing are combined such that the static rigidity of the bearing apparatus is born by the active magnetic bearing and the dynamic rigidity is born by the dynamic pressure bearing.

17 Claims, 6 Drawing Sheets

BEARING APPARATUS

BACKGROUND OF THE INVENTION

1. Field of the Invention

The present invention relates to a bearing apparatus having a rotator body and a non-rotation body in which the rotator body is supported in a thrust direction by a thrust dynamic pressure generated between thrust bearing surfaces of the rotator body and the non-rotation body, which is applicable as, for example, a bearing apparatus of a hard disc drive motor, and a variety of optical disc drive motors.

2. Description of Related Art

A variety of strict demands in higher accuracy at higher speeds, longer service life, and lower noise are imposed on small size spindle motors that are used for hard disc drive apparatuses and various optical disc drives. To meet the demands, it is effective to make bearing apparatuses with dynamic pressure bearings. In this connection, a bearing apparatus in which its radial bearing and thrust bearing are both formed by dynamic pressure bearings has been developed.

A typical dynamic pressure bearing uses a lubrication fluid filled in a minute gap between a rotator body and a non-rotation body and generates a pressure by a shearing force caused by the lubrication fluid to support the rotator body in a non-contact manner. Therefore, it is essential to work parts at a high level of precision and assemble them at a high level of precision in order to provide and maintain a minute gap between the rotator body and the non-rotation body.

With high precision machine tools, a radial dynamic pressure bearing can be relatively readily manufactured with high precision, and its required assembly accuracy can be relatively readily achieved. However, for a thrust dynamic bearing, much strict accuracy is required since a flange shaped thrust plate needs to be assembled on a rotator shaft, and a level of precision in the order of $\mu$m needs to be secured in the assembly work. Also, since a thrust dynamic bearing supports the weight in the direction of gravity, the rotator body may often contact the non-rotation body when the rotation is stopped, which results in shortening the service life of the bearing apparatus, and also the service life of the motor.

To solve the problems described above, a bearing apparatus is provided with a radial bearing that is formed from a dynamic pressure bearing and a thrust bearing that is formed from a magnetic bearing.

However, the thrust bearing formed from a magnetic bearing has the following problems.

When the magnetic bearing is a controlled type to maintain the position of the rotator body in its axial direction constant, electric power needs to be constantly supplied. As a result, the motor suffers a large amount of losses.

Since the magnetic force is relatively small compared to the dynamic pressure, the rotator body would likely contact the non-rotation body by impact forces.

Since the magnetic force is relatively small compared to the dynamic pressure, the bearing apparatus tends to become larger in size to obtain a predetermined supporting force in the thrust direction.

Since the magnetic bearing has a lower dynamic rigidity compared to the dynamic pressure bearing, it is rather vulnerable to high frequency vibrations compared to the dynamic pressure bearing.

SUMMARY OF THE INVENTION:

The present invention has been made to solve the problems of the conventional art describe above.

It is an object of the present invention to provide a bearing apparatus having an active magnetic bearing that requires electrical power that is used only to control vibration components. As a result, the bearing apparatus in accordance with the present invention reduces the power consumption, securely prevents contacts between a rotator body and a non-rotation body and substantially extends the service life of the bearing apparatus.

It is another object of the present invention to provide a bearing apparatus that may include a thrust dynamic pressure bearing and an active magnetic bearing provided in combination such that characteristics of the respective bearings are effectively used. For example, the static rigidity is born by the active magnetic bearing and the dynamic rigidity is born by the dynamic pressure bearing. As a result, the bearing apparatus has a higher accuracy and a longer service life and can reduce the load torque at the time of starting its rotation, compared to a bearing apparatus that uses only a thrust dynamic pressure bearing or an active magnetic bearing.

It is still another object of the present invention to provide a bearing apparatus that may include a thrust dynamic pressure bearing and an active magnetic bearing used in combination. In one aspect of the present embodiment, the load applied to the dynamic pressure bearing is reduced compared to a bearing apparatus that uses only a dynamic pressure bearing, the distance of a fine gap that forms the dynamic pressure bearing can be made relatively large, the need to strictly manage the working precision and assembly accuracy for parts of the dynamic pressure bearing can be eliminated, and the manufacturing cost is lowered.

In accordance with an embodiment of the present invention, a bearing apparatus includes a rotator body, a non-rotation body rotatably supporting the rotator body, and a lubrication fluid present between the rotator body and the non-rotation body in which the rotator body is supported in a thrust direction by a thrust dynamic pressure bearing formed between the rotator body and the non-rotation body. The bearing apparatus comprises an active magnetic bearing formed by a driving coil disposed on one of the rotator body and the non-rotation body and a magnet disposed on the other thereof, and a gap sensor that detects an axial direction gap between the rotator body and the non-rotation body, wherein the axial direction gap is controlled by controlling current applied to the driving coil based on an output of the gap sensor.

Other features and advantages of the invention will be apparent from the following detailed description, taken in conjunction with the accompanying drawings that illustrate, by way of example, various features of embodiments of the invention.

EMBODIMENTS OF THE PRESENT INVENTION

A bearing apparatus in accordance with an embodiment of the present invention is described below with reference to the accompanying drawings.

Figure 1:
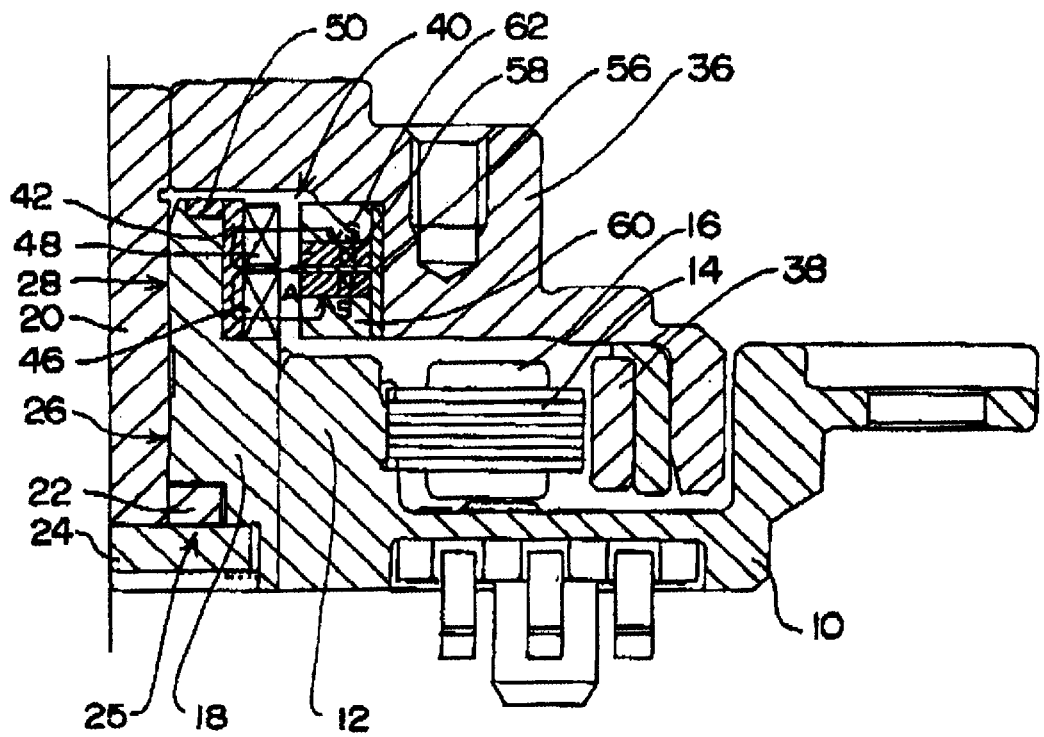
FIG. 1 shows a cross-sectional view of a bearing apparatus in accordance with one embodiment of the present invention.

Referring to FIG. 1, a frame 10 of a motor includes a cylindrical holder section 12 formed in one piece with the frame 10 in a central section of the frame 10. A stator core 14 is affixed to the holder section 12 with an internal surface of the stator core 14 being in a pressure contact with an external peripheral surface of the holder section 12. The stator core 14 is a stacked layered core, and has a plurality of radially extending salient poles. A driving coil 16 is wound around each of the salient poles.

A cylindrical bearing member 18 is inserted in the holder section 12 and affixed to an internal peripheral side of the holder section 12. A rotor shaft 20 as a rotator body is inserted in a central bore of the bearing member 18, and the rotor shaft 20 is relatively rotatably supported by the bearing member 18. A thrust plate 22 is coupled and affixed to an external periphery of a lower end portion of the rotor shaft 20. The lower end surface of the rotor shaft 20 and a lower surface of the thrust plate 22 are located generally in the same plane. A thrust receiving member 25 is embedded in a lower end of the bearing member 18, and coupled surfaces of the bearing member 18 and the thrust receiving member 25 are sealed. In this manner, the bearing member 18 has a sack-like structure in which one end in the axial direction, i.e., the lower section, of the bearing member 18, is sealed, and the other end, i.e., the upper section is open.

Minute gaps are provided between an upper surface of the thrust plate 22 and an opposing surface of the bearing member 18, and a lower surface of the thrust plate 22 and an upper surface of the thrust receiving member 24 that is disposed opposite to the thrust plate 22. Lubrication oil is provided in the gap. Dynamic pressure generation grooves are formed in at least one of the upper surface of the thrust plate 22 and the opposing surface of the bearing member 18, and at least one of the lower surface of the thrust plate 22 and the upper surface of the thrust receiving member 24, respectively, to thereby form a thrust dynamic pressure bearing section 25. As the thrust plate 22 rotates with the rotor shaft 20, the pressure of the lubrication oil is increased by the dynamic pressure generation grooves such that dynamic pressure is generated. The dynamic pressure is dynamic pressure that acts in the thrust direction, whereby the rotor shaft 20 is supported in a noncontact manner in the thrust direction.

A minute gap is also provided between an external peripheral surface of the rotor shaft 20 and an internal peripheral surface of the bearing member 18, and lubrication oil is also provided in the gap. Dynamic pressure generation grooves are formed in at least one of a region in the internal peripheral surface adjacent to the lower end of the bearing member 18 and the opposing external peripheral surface of the rotor shaft 20, and at least one of a region in the internal peripheral surface adjacent to the upper end of the bearing member 18 and the opposing external peripheral surface of the rotor shaft 20, respectively, such that a radial dynamic pressure bearing section 26 and a radial dynamic pressure bearing section 28 are formed up and down along the axial direction. As the rotor shaft 20 rotates, dynamic pressure is generated in the radial dynamic pressure bearing section 26 and the radial dynamic pressure bearing section 28 such that the rotor shaft 20 is supported in a circumferential direction, i.e., a radial direction in a noncontact matter.

A flattened cup-like rotor housing 36 is provided such that an upper end section of the rotor shaft 20 that protrudes from the upper end of the bearing member 18 is inserted in a central hole of the rotor housing 36 such that the rotor housing 36 is retained such that it rotates with the rotor shaft 20. A cylindrical rotor magnet 38 is affixed to an internal surface of an external peripheral wall of the rotor housing 36. An internal surface of the rotor magnet 38 and an external peripheral surface of the stator core 14 are disposed opposite to each other with a specified gap provided therebetween. Current flowing in each of the driving coils 16 is controlled depending on the rotational position of the rotor magnet to controllably rotate the rotor. The motor shown in the figure is configured for the use as a motor of a hard disc drive. However, the bearing apparatus in accordance with the present invention is not limited to this particular use and can be used for any other purposes.

The minute gaps formed in the thrust dynamic pressure bearing section 25, the radial dynamic pressure bearing section 26 and the radial dynamic pressure bearing section 28 are mutually connected, and lubrication oil is provided in the mutually connected minute gaps.

Figure 2:
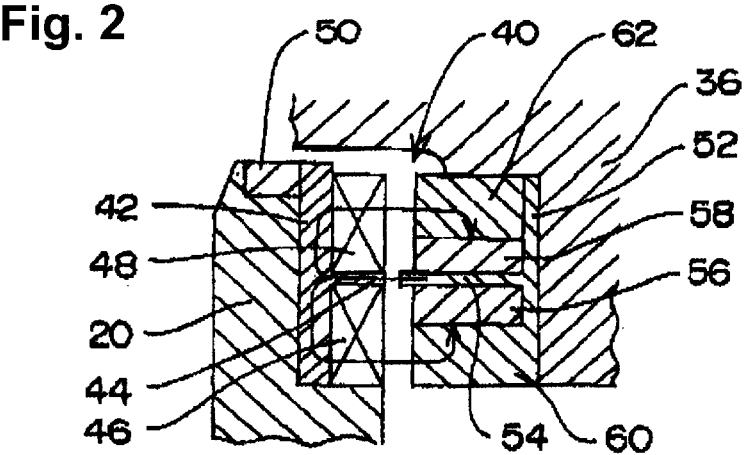
FIG. 2 shows an enlarged cross-sectional view of an active magnetic bearing section of the bearing apparatus shown in FIG. 1.

An active magnetic bearing 40 is formed between the rotor housing 36 that is provided substantially in one piece with the rotor shaft 20 and the bearing member 18 that is a non-rotation body. The active magnetic bearing 40 includes, as shown in FIG. 2, a ring-shape yolk 42 that is coupled to a small-diameter section formed in the upper external peripheral surface of the rotor shaft 20, driving coils 46 and 48, a yolk 52 provided on the side of the rotor housing 36, magnets 56 and 58, and yolks 60 and 62. The yolk 42 on the side of the coil has a flange 44 in a center thereof along the axial direction. The driving coils 46 and 48 are wound around the yolk 42 in upper and lower sides about the flange 44. The yolk 52 on the side of the magnets 56 and 58 also has a flange 54, and magnetized magnets 56 and 58 are affixed to upper and lower sides about the flange 54 in the axial direction as shown in FIG. 1. The yolk 60 in a block shape is affixed to a lower surface of the magnet 56, and the yolk 62 in a block shape is affixed to an upper surface of the magnet 58.

An external peripheral surface of the flange 44 of the coil-side yolk 42 and an internal peripheral surface of the flange 54 on the magnet-side yolk 52 define an opposing surface section that has a narrow gap in the radial direction.

In other words, the flange 44 of the coil-side yolk 42 and the flange 54 on the magnet-side yolk 52 are disposed opposite to one another with a narrow gap provided between the external peripheral surface of the flange 44 of the coil-side yolk 42 and the internal peripheral surface of the flange 54 on the magnet-side yolk 52. A magnetic circuit is formed such that magnetic flux going out from the two magnets 56 and 58 passes from the flange 54 of the yolk 52 across the gap to the flange 44 of the yolk 42, and separates in the yolk 42 into upper and lower fluxes, which traverse the driving coils 46 and 48 and the gaps, pass the yolks 60 and 62 and return to the magnets 56 and 58.

The magnetic flux is condensed and pass through the gap between the flange 44 of the coil-side yolk 42 and the flange 54 of the magnetic side yolk 52 such that a force that mutually attracts the flanges 44 and 54 works. The magnetic attraction force acts as a force to maintain a rotator body such as the rotor housing 36 or the like in the axial direction at a predetermined position with respect to a non-rotation body such as the bearing member 18 or the like. Accordingly, the coil-side yolk 42, the magnet-side yolk 52 and the magnets 56 and 58 form a passive magnetic bearing.

Also, Lorentz force is generated in the driving coils 46 and 48 by controllably applying current to the driving coils 46 and 48, in addition to the magnetic flux traversing the driving coils 46 and 48. Depending on their repelling forces, the position of the rotator body in the axial direction can be controlled. As shown in FIG. 1, a gap sensor 50 is embedded in a top end of the bearing member 18 and disposed opposite to a ceiling surface of the rotor housing 36, such that the gap sensor 50 can detect a gap in the axial direction between a non-rotation body such as the bearing member 18 and a rotator body such as the rotor housing 36. A detected output of the gap sensor 50 is fed back to control the current to the driving coils 46 and 48 such that the gap in the axial direction between the non-rotation body and the rotator body is always kept at a predetermined value. In this manner, the driving coils 46 and 48, the magnets 56 and 58, the coil-side yolk 42 and the magnet-side yolk 52 form the active magnetic bearing 40.

It is noted that the gap sensor 50 can be formed from a known sensor, such as, a vortex current sensor, an optical sensor, a static capacitance sensor and the like.

By the embodiment described above with reference to FIGS. 1 and 2, the active magnetic bearing 40 and a passive magnetic bearing that is formed by the yolks 42 and 52 and the magnets 56 and 58 are combined such that the passive bearing bears static external disturbances such as the gravity, and the active magnetic bearing 40 that requires electrical power bears only the control of vibration components. As a result, the power consumption is lowered, and contacts between the rotator body and the non-rotation body are securely prevented, and the service life can be substantially extended.

Also, the thrust dynamic pressure bearing 25 and the active magnetic bearing 40 are combined such that characteristics of the respective bearings are effectively used. For example, the static rigidity is born by the active magnetic bearing 40 and the dynamic rigidity is born by the dynamic pressure bearing 25. As a result, the bearing apparatus has a higher accuracy and a longer service life and can reduce the load torque at the time of starting its rotation, compared to a bearing apparatus that uses only the thrust dynamic pressure bearing 25 or the active magnetic bearing 40.

Furthermore, since the thrust dynamic pressure bearing 25 and the active magnetic bearing 40 are combined, the load applied to the dynamic pressure bearing is reduced compared to a bearing apparatus that uses only the dynamic pressure bearing 25, the distance of a fine gap that forms the dynamic pressure bearing 25 can be made relatively large, such that the management of working precision and assembly accuracy for parts of the dynamic pressure bearing 25 can be facilitated, and the manufacturing cost is lowered.

Bearing apparatuses in accordance with other embodiments of the present invention are described below. It is noted that these embodiments are applied to spindle motors, and therefore the motor section, thrust dynamic pressure bearing section, and radial dynamic pressure bearing section have substantially the same structures as those of the embodiment described above. Accordingly, the same components are referred to by the same reference numbers and their description is omitted.

Figure 3:
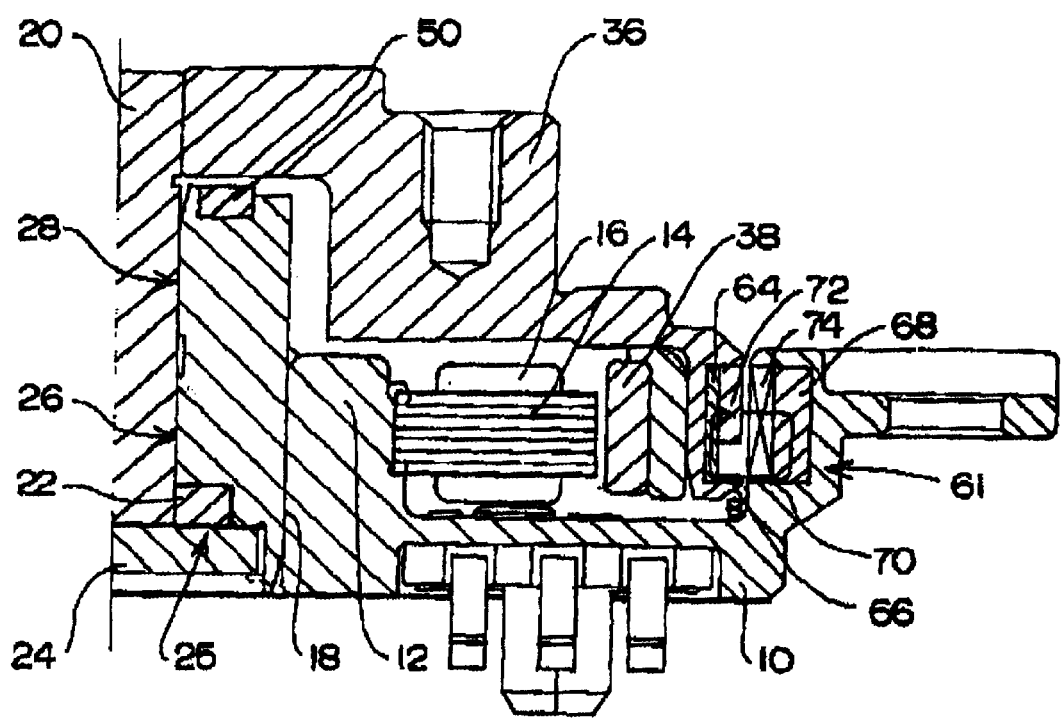
FIG. 3 shows a cross-sectional view of a bearing apparatus in accordance with another embodiment of the present invention.

In an embodiment shown in FIG. 3, an active magnetic bearing 61 and a passive magnetic bearing are provided between an external peripheral section of a rotor housing 36 and a frame 10 that is a non-rotation body. A ring-shape magnet-side yolk 64 having a flange 66 at its lower end section, which defines an L-shape cross section, is mounted on the external peripheral section of the rotor housing 36. A ring-shape magnet 72 is attached to an external peripheral surface of the yolk 64. A ring-shape coil-side yolk 68 having an inwardly facing flange 70 at its lower end section, which defines an inverse L-shape cross section, is affixed to the frame 10 at a position opposing to the yolk 64 and the magnet 72. A driving coil 74 that is wound along an internal peripheral surface of the yolk 68 is affixed to the internal peripheral surface of the yolk 68.

An external peripheral surface of the flange 66 of the yolk 64 and an internal peripheral surface of the flange 70 of the yolk 68 define an opposing surface section that has a narrow gap in the radial direction. A magnetic circuit is formed such that magnetic flux going out from the magnet 72 passes the yolk 64, traverses the opposing surface section, reaches the yolk 68, passes the driving coil 74 and the gap, and returns to the magnet 72. The flanges 66 and 70 of the yolks 64 and 68 are magnetically attracted to one another, such that they would maintain the rotator body at a predetermined position in the axial direction with respect to the non-rotation body. In this manner, the yolks 64 and 68 and the magnet 72 form a passive magnetic bearing.

Also, current to the driving coil 74 may be controlled according to an output of a gap sensor 50, such that the position of the rotator body in the axial direction with respect to the non-rotation body can be finely adjusted. In this manner, the yolks 64 and 68, the magnet 72 and the driving coil 74 form an active magnetic bearing.

In the manner described above, since the embodiment shown in FIG. 3 also has the thrust dynamic pressure bearing 25, as well as the passive magnetic bearing and the active magnetic bearing 61, the same effects obtained by the embodiment shown in FIGS. 1 and 2 can be obtained.

Figure 4:
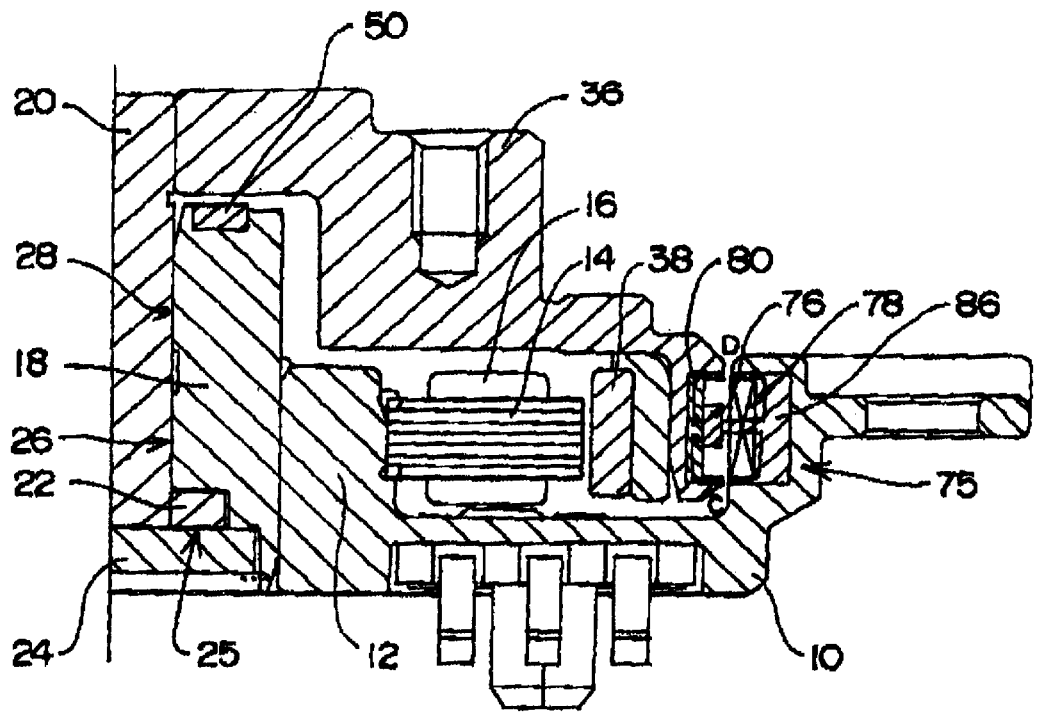
FIG. 4 shows a cross-sectional view of a bearing apparatus in accordance with still another embodiment of the present invention.
Figure 5:
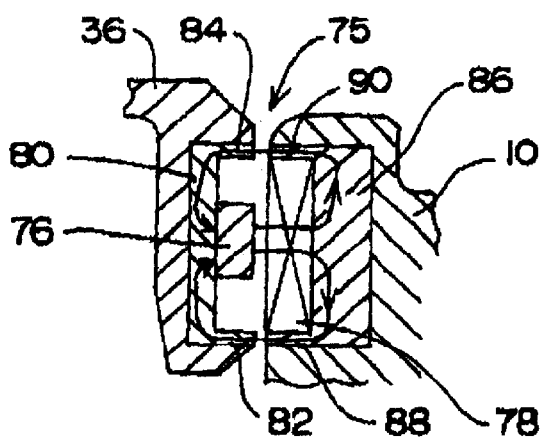
FIG. 5 shows an enlarged cross-sectional view of an active magnetic bearing section of the bearing apparatus shown in FIG. 4.

An embodiment shown in FIGS. 4 and 5 is similar to the embodiment shown in FIG. 3, but is different from the embodiment shown in FIG. 3 in that each of a magnet-side yolk 80 and a coil-side yolk 86 has a groove configuration in their cross section. Referring to FIGS. 4 and 5, the magnet-side yolk 80 has outwardly facing flanges 82 and 84 at its upper and lower end sections, and the coil-side yolk 86 has inwardly facing flanges 88 and 90 at its upper and lower end sections. An external peripheral surface of the flange 82 and an internal peripheral surface of the flange 88 define an opposing surface section that has a narrow gap in the radial direction.

A magnet 76 magnetized in the radial direction is affixed between the flanges 82 and 84 on an external peripheral surface of the magnet-side yolk 80, and a coil 78 is affixed between the flanges 88 and 90 on an internal peripheral surface of the coil-side yolk 86. The coil 78 is wound along an internal peripheral surface of the yolk 86. Magnetic flux going out from the magnet 76 traverses the gap and coil 78, and then bifurcates up and down in the yolk 86. Then, in one magnetic circuit, the magnetic flux passes the flange 88, the flange 82, and the main body of the yolk 80, and returns to the magnet 76, and in another magnetic circuit, the magnetic flux passes the flange 90, the flange 84, and the main body of the yolk 80, and returns to the magnet 76. The flanges 88 and 82 magnetically attract one another, and the flanges 90 and 84 magnetically attract one another to thereby maintain the rotator body at a predetermined position in the axial direction with respect to the non-rotation body. In this manner, the yolks 80 and 86 and the magnet 78 form a passive magnetic bearing.

Also, current to the driving coil 78 may be controlled according to an output of a gap sensor 50, such that the position of the rotator body in the axial direction with respect to the non-rotation body can be finely adjusted. In this manner, the yolks 80 and 86, the magnet 76 and the driving coil 78 form an active magnetic bearing 75.

In this manner, since the embodiment shown in FIG. 4 also has the thrust dynamic pressure bearing 25, as well as the passive magnetic bearing and the active magnetic bearing 75, the same effects obtained by the embodiment shown in FIGS. 1 and 2 can be obtained.

Figure 6:
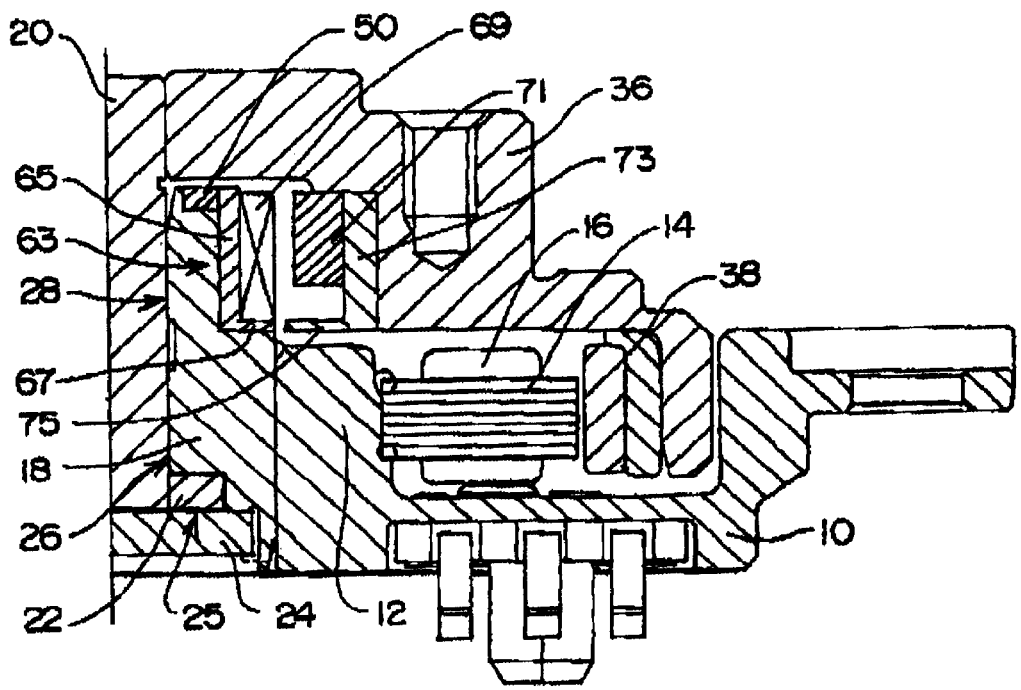
FIG. 6 shows a cross-sectional view of a bearing apparatus in accordance with still another embodiment of the present invention.

In an embodiment shown in FIG. 6, an active magnetic bearing and a passive magnetic bearing similar to those provided in the embodiment shown in FIG. 3 are respectively provided on a bearing member 18 and an internal peripheral side of a rotor housing 36 that is disposed opposite to the bearing member 18. Also, a driving coil 69 is disposed on the bearing member 18 that is a non-rotation body and a magnet 71 is disposed on the rotor housing 36 that is a rotator body. In FIG. 6, a coil-side yolk 65 having a flange 67 and a magnet-side yolk 73 having a flange 75 are provided. The flanges 67 and 75 of the two yolks 65 and 73 define opposing surface sections that form a narrow gap in the radial direction. The opposing surface sections form a passive magnetic bearing.

Also, the yolks 65 and 73, the magnet 71 and the driving coil 69 form an active magnetic bearing 63.

In this manner, since the embodiment shown in FIG. 6 also has the thrust dynamic pressure bearing 25, as well as the passive magnetic bearing and the active magnetic bearing 63, the same effects obtained by the embodiments described above can be obtained.

Figure 7:
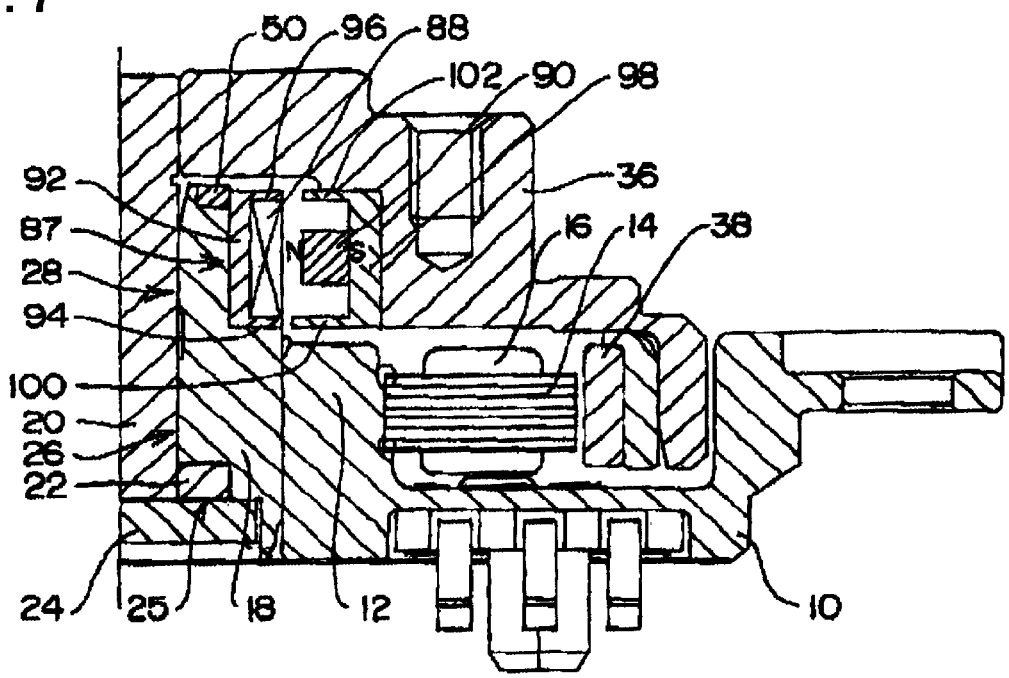
FIG. 7 shows a cross-sectional view of a bearing apparatus in accordance with still another embodiment of the present invention.

In an embodiment shown in FIG. 7, an active magnetic bearing and a passive magnetic bearing similar to those provided in the embodiment shown in FIG. 4 are respectively provided on a bearing member 18 and an internal peripheral side of a rotor housing 36 that is disposed opposite to the bearing member 18. Also, a driving coil 88 is disposed on the bearing member 18 that is a non-rotation body and a magnet 90 is disposed on the rotor housing 36 that is a rotator body. In FIG. 7, a coil-side yolk 92 having flanges 94 and 96 and a magnet-side yolk 98 having flanges 100 and 102 are provided. A set of the flanges 94 and 100 and a set of the flanges 96 and 102 of the two yolks 92 and 98 each define opposing surface sections that form a narrow gap in the radial direction. The opposing surface sections form a passive magnetic bearing.

Also, the yolks 92 and 94, the magnet 90 and the driving coil 88 form an active magnetic bearing 87 similar to the one provided in the embodiment shown in FIG. 4.

In this manner, since the embodiment shown in FIG. 7 also has the thrust dynamic pressure bearing 25, as well as the passive magnetic bearing and the active magnetic bearing 87, the same effects obtained by the embodiments described above can be obtained.

Figure 8:
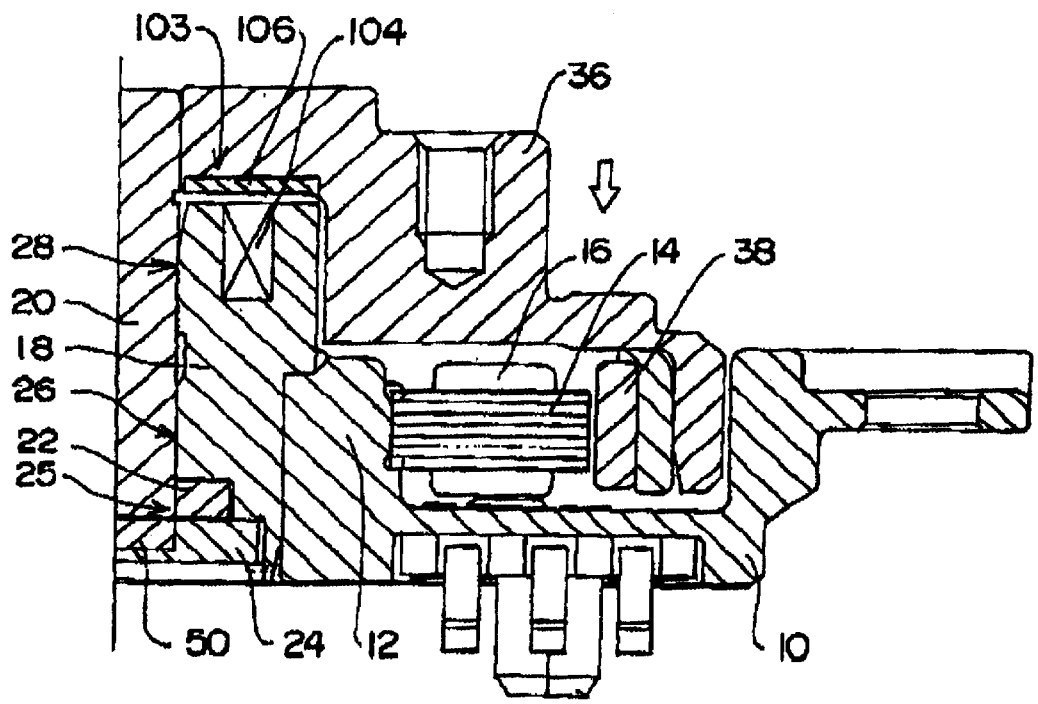
FIG. 8 shows a cross-sectional view of a bearing apparatus in accordance with still another embodiment of the present invention.

In the embodiments described above, an active magnetic bearing is formed by a magnet and a coil. However, in accordance with another embodiment shown in FIG. 8, an active magnetic bearing is formed by a driving coil 104 and a magnetic material 106 in place of a magnet. Referring to FIG. 8, a driving coil 104 that is wound along a peripheral direction of a bearing member 18 is embedded in an upper end of the bearing member 18. A magnetic material 106 that is formed from a ring shape magnetic plate is affixed to a surface of a rotor housing 36 which is opposite to the upper surface of the bearing member 18, such that an upper surface of the driving coil 104 and the magnetic material 106 are opposed to one another.

When a rotator body including a rotor shaft 20 and the rotor housing 36 rotates, the rotator body is placed in a non-contact state in the thrust direction by a thrust dynamic pressure bearing 25. By controlling current to a driving coil 104 according to an output of a gap sensor 50, the magnetic attraction force of the magnetic material 106 is controlled with respect to the bearing member 18 that is a non-rotation body, such that the position of the rotator body in the axial direction with respect to the non-rotation body can be controlled. In this manner, the magnetic material 106 and the driving coil 104 form an active magnetic bearing 103. However, since this embodiment does not include a magnet, a passive magnetic bearing is not provided. It is noted that, in the embodiment shown in FIG. 8, the gap sensor 50 is embedded in a thrust bearing member 24 that is formed in one piece with the bearing member 18 that is a non-rotation body, and the gap sensor 50 is disposed opposite to a bottom surface of the rotor shaft 20 that is a rotator body.

The embodiment shown in FIG. 8 does not have a passive magnetic bearing, but is provided with the thrust dynamic pressure bearing 25 and the active magnetic bearing 103, which are provided such that characteristics of the respective bearings are effectively used. Namely, the static rigidity is born by the active magnetic bearing 103 and the dynamic rigidity is born by the dynamic pressure bearing 25. As a result, the bearing apparatus has a higher accuracy and a longer service life and can reduce the load torque at the time of starting its rotation, compared to a bearing apparatus that uses only the thrust dynamic pressure bearing 25 or the active magnetic bearing 103.

Furthermore, the load applied to the dynamic pressure bearing is reduced compared to a bearing apparatus that uses only the thrust dynamic pressure bearing 25, the distance of a fine gap that forms the dynamic pressure bearing 25 can be made relatively large, the management of working precision and assembly accuracy for parts of the dynamic pressure bearing 25 can be facilitated, and the manufacturing cost is lowered.

Figure 9:
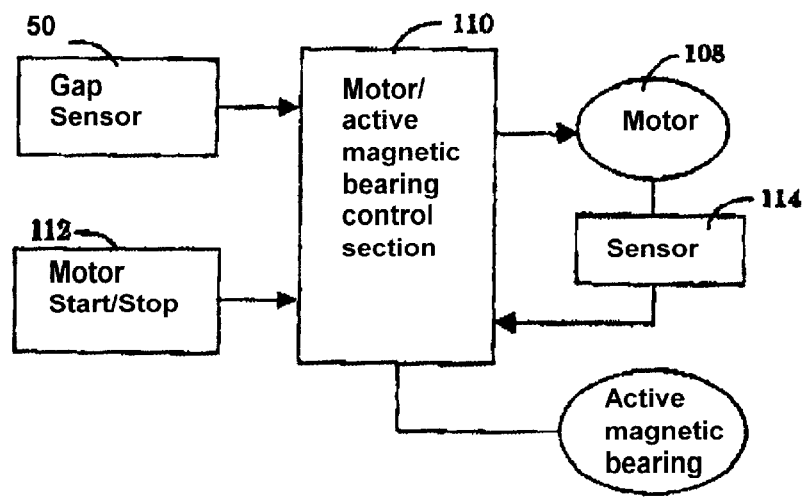
FIG. 9 shows a block diagram of an example of a control system applicable to the present invention.

Next, an example of a control system for a motor having a bearing apparatus in accordance with the present invention is described with reference to FIG. 9. In FIG. 9, a motor/active magnetic bearing control section 110 is formed from a CPU or any one of appropriate control circuits. An output signal of the gap sensor 50, and a motor start command signal and stop command signal from a motor start/stop section 112 are input in the motor/active magnetic bearing control section 110. The motor/active magnetic bearing control section 110 controls start and stop of the motor 108 based on command signals from the motor start/stop section 112, and also controls rotational speed of the motor according to a signal from the sensor 114 that detects the rotational speed of the motor. The control system described above controls an active magnetic bearing section such that a gap detected by the gap sensor is maintained constant.

Figure 10:
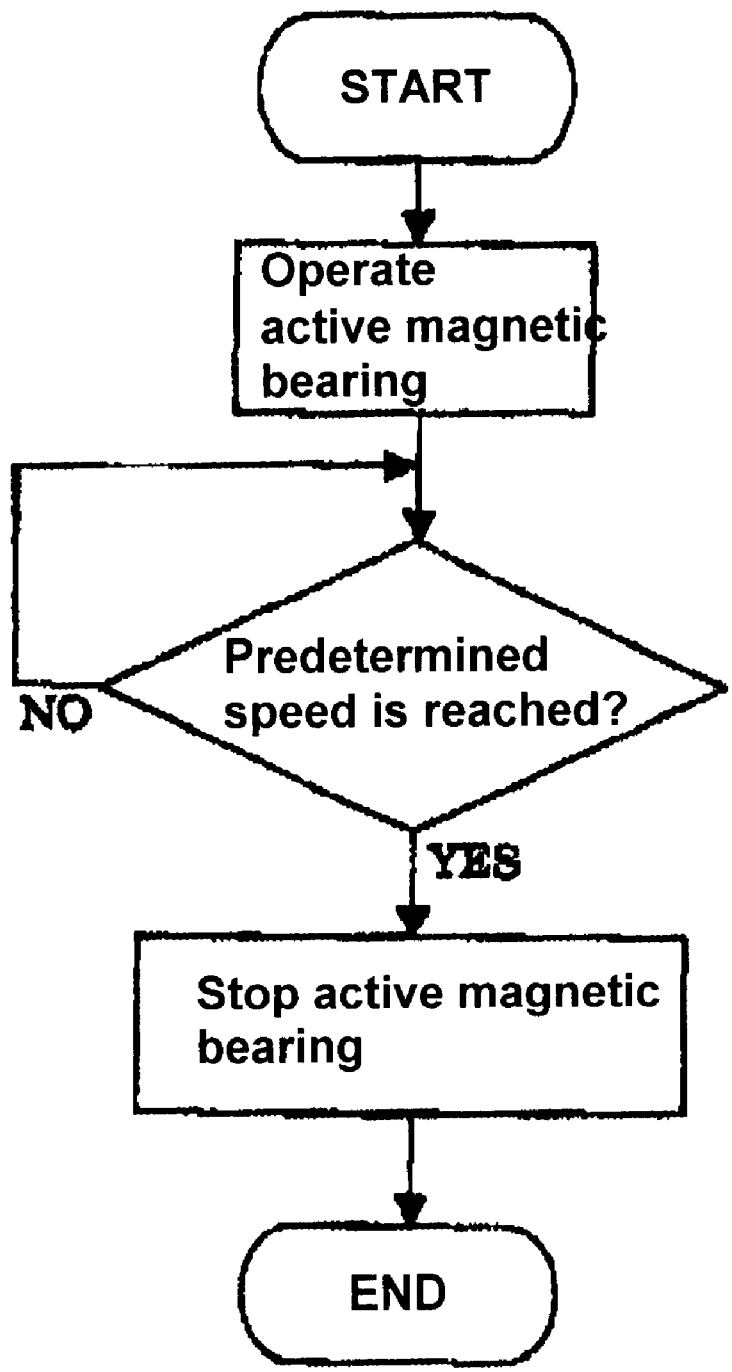
FIG. 10 shows a flow chart of an operation of the control system.

To reduce the power consumption, the control system described above performs a control shown in FIG. 10. When a command to start the motor is issued, the motor starts its rotation and the active magnetic bearing starts its operation to place the rotator body and the non-rotation body in a non-contact state. When the rotation speed of the motor reaches a specified rotation speed, the thrust dynamic pressure bearing functions to support the rotator body with respect to the non-rotation body in a non-contact manner, and the active magnetic bearing is stopped.

Although not shown in the figure, when the motor is stopping, and the rotation speed of the motor lowers to a specified rotation speed, the operation of the active magnetic bearing may be started such that the rotator body does not come in contact with the non-rotation body. When the motor stops, the operation of the active magnetic bearing may be stopped.

Also, the frequency band of a feed back loop for controlling the active magnetic bearing may be appropriately set such that the frequency band corresponding to rotation speeds in which the dynamic pressure bearing does not function is provided with a larger control gain, and the frequency band corresponding to rotation speeds in which the dynamic pressure bearing functions is provided with a smaller control gain. As a result, effects similar to those described above can be obtained. The motor/active magnetic bearing control section 110 controls current to the driving coil of the active magnetic bearing based on an output from the gap sensor while the motor 108 is rotating, to thereby control vibration components.

In accordance with the present invention, a thrust dynamic pressure bearing section does not have to be provided with a fine gap of ten and some μm to several μm, which is the requirement by a conventional thrust dynamic pressure bearing section, but can be provided with a gap of several ten μm or greater. Also, when a passive magnetic bearing is equipped with a sufficient static rigidity, the passive magnetic bearing can be designed to function only as a viscous damper. It is noted that a thrust dynamic pressure bearing section that is formed from a thrust plate and a thrust bearing member can be functioned as a fall-out stopper for the rotator body.

In accordance with the present invention, a bearing apparatus may include a dynamic pressure bearing and an active magnetic bearing which are combined such that characteristics of the respective bearings are effectively used. For example, the static rigidity is born by the active magnetic bearing and the dynamic rigidity is born by the dynamic pressure bearing. As a result, the bearing apparatus has a higher precision and a longer service life and can reduce the load torque at the time of starting its rotation, compared to a bearing apparatus that uses only a dynamic pressure thrust bearing or an active magnetic bearing.

Furthermore, the load applied to the dynamic pressure bearing is reduced compared to a bearing apparatus that uses only a dynamic pressure bearing, and the distance of a fine gap that forms the dynamic pressure bearing can be made relatively large, such that the need to strictly manage the working precision and assembly accuracy for parts of the dynamic pressure bearing can be eliminated, and the manufacturing cost is lowered.

In accordance with the present invention, an active magnetic bearing and a passive magnetic bearing are combined such that the passive bearing bears static external disturbances such as the gravity, and the active magnetic bearing that requires electrical power bears only the control of vibration components. As a result, the power consumption is lowered, and contacts between a rotator body and a non-rotation body are securely prevented, and the service life can be substantially extended.

Also, an active magnetic bearing may be operated when a rotator body is at a specified rotation speed or lower. As a result, the active magnetic bearing can function in a lower rotation speed region where the dynamic pressure bearing does not function such that contacts between the rotator body and the non-rotation body can be avoided.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A bearing apparatus comprising:
   a thrust dynamic pressure bearing and an active magnetic bearing provided in combination wherein the active magnetic bearing bears a static rigidity and the thrust dynamic pressure bearing bears a dynamic rigidity; and
   a gap sensor that detects a gap in an axial direction between the rotator body and the non-rotation body, wherein the gap in the axial direction is controlled by controlling current applied to the driving coil based on an output of the gap sensor.

2. A bearing apparatus comprising:
   a thrust dynamic pressure bearing and an active magnetic bearing provided in combination wherein the active magnetic bearing bears a static rigidity and the thrust dynamic pressure bearing bears a dynamic rigidity; and
   a passive magnetic bearing wherein the passive magnetic bearing bears static external disturbances and the active magnetic bearing controls only vibration components.

3. A bearing apparatus according to claim 2, wherein the thrust dynamic pressure bearing is formed from at least parts of a rotator body and a non-rotation body rotatably supporting the rotator body, and a lubrication fluid provided between the rotator body and the non-rotation body wherein the rotator body is supported in a thrust direction by a thrust dynamic pressure generated between the rotator body and the non-rotation body.

4. A bearing apparatus according to claim 3, wherein the active magnetic bearing is formed from a driving coil disposed on one of the rotator body and the non-rotation body and a magnet disposed on the other of the rotator body and the non-rotation body.

5. A bearing apparatus according to claim 4, further comprising a gap sensor that detects a gap in an axial direction between the rotator body and the non-rotation body, wherein the gap in the axial direction is controlled by controlling current applied to the driving coil based on an output of the gap sensor.

6. A bearing apparatus including a rotator body and a non-rotation body rotatably supporting the rotator body, and a lubrication fluid present between the rotator body and the non-rotation body in which the rotator body is supported in a thrust direction by a thrust dynamic pressure bearing formed between the rotator body and the non-rotation body, the bearing apparatus comprising:

an active magnetic bearing formed by a driving coil disposed on one of the rotator body and the non-rotation body and a magnet disposed on the other of the rotator body and the non-rotation body; and a gap sensor that detects a gap in an axial direction between the rotator body and the non-rotation body, wherein the gap in the axial direction is controlled by controlling current applied to the driving coil based on an output of the gap sensor.

7. A bearing apparatus according to claim 6, wherein the active magnetic bearing includes a coil-side yolk that retains the driving coil and a magnet-side yolk that retains the magnet disposed opposite in a radial direction to the driving coil.

8. A bearing apparatus according to claim 7, wherein each of the coil-side yolk and the magnet-side yolk has an opposing surface section to narrow a separation in the radial direction, and a passive magnetic bearing is formed by the opposing surface sections.

9. A bearing apparatus according to claim 7, wherein the active magnetic bearing operates when the rotator body is at a specified rotation speed or lower.

10. A bearing apparatus according to claim 7, further comprising a radial bearing that generates a radial dynamic pressure between the rotator body and the non-rotation body.

11. A bearing apparatus according to claim 7, wherein the active magnetic bearing provides a static rigidity for the bearing and the thrust dynamic bearing provides a dynamic rigidity for the bearing.

12. A bearing apparatus including a rotator body and a non-rotation body rotatably supporting the rotator body, and a lubrication fluid present between the rotator body and the non-rotation body in which the rotator body is supported in a thrust direction by a thrust dynamic pressure generated between the rotator body and the rotating body, the bearing apparatus comprising:

an active magnetic bearing formed by a driving coil disposed on one of the rotator body and the non-rotation body and a magnetic material disposed on the other of the rotator body and the non-rotation body; and a gap sensor that detects an axial direction gap between the rotator body and the non-rotation body, wherein the axial direction gap is controlled by controlling current applied to the driving coil based on an output of the gap sensor.

13. A bearing apparatus according to claim 12, wherein the active magnetic bearing is formed from a driving coil and a magnetic material that are disposed opposite to one another in the axial direction.

14. A bearing apparatus according to claim 12, wherein the non-rotation body includes a bearing member, the rotator body includes a rotor housing rotatably supported with respect to the non-rotation body, the active magnetic bearing includes a driving coil embedded in a top surface of the bearing member traversing the axial direction and a magnetic material disposed on a surface of the rotor housing that is opposed to the surface of the bearing member wherein a gap between the driving coil and the magnetic material is controllably changed based on an output of the gap sensor.

15. A bearing apparatus according to claim 14, further comprising a radial dynamic pressure bearing that generates the radial dynamic pressure between the rotator body and the non-rotation body.

16. A bearing apparatus according to claim 15, wherein the active magnetic bearing is disposed adjacent to one end of the bearing member and the thrust dynamic pressure bearing is disposed adjacent the other end of the bearing member.

17. A bearing apparatus according to claim 12, wherein the active magnetic bearing provides a static rigidity, and the thrust dynamic pressure bearing provides a dynamic rigidity.

* * * * *